United States Patent
Aziz et al.

(10) Patent No.: US 8,743,945 B2
(45) Date of Patent: *Jun. 3, 2014

(54) SHIFT REGISTER BASED DOWNSAMPLED FLOATING TAP DECISION FEEDBACK EQUALIZATION

(75) Inventors: Pervez M. Aziz, Dallas, TX (US); Hiroshi Kimura, San Jose, CA (US); Amaresh V. Malipatil, San Jose, CA (US); Hairong Gao, Sunnyvale, CA (US)

(73) Assignee: LSI Corporation, Milpitas, CA (US)

( * ) Notice: Subject to any disclaimer, the term of this patent is extended or adjusted under 35 U.S.C. 154(b) by 135 days.

This patent is subject to a terminal disclaimer.

(21) Appl. No.: 13/540,923

(22) Filed: Jul. 3, 2012

(65) Prior Publication Data

US 2013/0230093 A1  Sep. 5, 2013

Related U.S. Application Data

(63) Continuation-in-part of application No. 13/410,735, filed on Mar. 2, 2012, now Pat. No. 8,537,885.

(51) Int. Cl.
 *H03H 7/30* (2006.01)

(52) U.S. Cl.
 USPC ........... 375/233; 375/226; 375/229; 375/230; 375/232; 375/234; 375/316; 375/346; 375/350; 455/63.1; 455/67.13; 455/114.2; 455/296; 455/501; 370/335; 370/342; 333/18; 333/28 R; 708/300; 327/551

(58) Field of Classification Search
 USPC ......... 375/226, 229, 230, 232, 233, 234, 316, 375/346, 350; 455/63.1, 67.13, 114.2, 296, 455/501; 370/335, 342; 333/18, 28 R; 708/300; 327/551
 See application file for complete search history.

(56) References Cited

U.S. PATENT DOCUMENTS

| | | |
|---|---|---|
| 8,121,183 B2 | 2/2012 | Zhong et al. |
| 2011/0142120 A1 | 6/2011 | Liu et al. |
| 2012/0076181 A1 | 3/2012 | Aziz et al. |

OTHER PUBLICATIONS

Bulzacchelli, et al., "A 10-Gb/s 5-Tap DFE/4-Tap FFE Transceiver in 90-nm CMOS Technology", IEEE Journal of Solid-State Circuits, vol. 41, No. 12, pp. 2885-2900, Dec. 2006 (USA).
Zhong, et al., "A 1.0625 ~ 14.025 Gb/s Multi-Media Transceiver with Full-Rate Source-Series-Terminated Transmit Driver and Floating-Tap Decision-Feedback Equalizer in 40nm CMOS", IEEE Journal of Solid-State Circuits, vol. 46, No. 12, pp. 3126-3139, Dec. 2011 (USA).
Aziz, et al., "A Class of Downsampled Floating Tap DFE Architectures with Application to Serial Links", presented at IEEE International Symposium on Circuits and Systems (ISCAS) May 20-23, 2012, (Seoul, Republic of Korea).

*Primary Examiner* — Leon Flores

(57) ABSTRACT

Described embodiments receive a signal by a set of fixed taps and a set of floating taps of a receiver, each tap corresponding to a detected symbol. Each of the floating taps is stored in a corresponding shift register to account for process, operating voltage and temperature (PVT) variations of the receiver without calibration of delay elements. Multiplexing logic selects (i) corresponding floating taps for equalization by coupling selected floating taps to the outputs of the fixed taps, and (ii) different phases of each possible floating tap position. The multiplexing logic prunes and/or amalgamates the phases of each possible floating tap position and selects floating taps based on a magnitude of each phase. A combiner adjusts each output value of the fixed taps and the selected floating taps by a corresponding tap-weight, combines the adjusted values into an output signal and subtracts the output signal from the input signal.

20 Claims, 13 Drawing Sheets

100

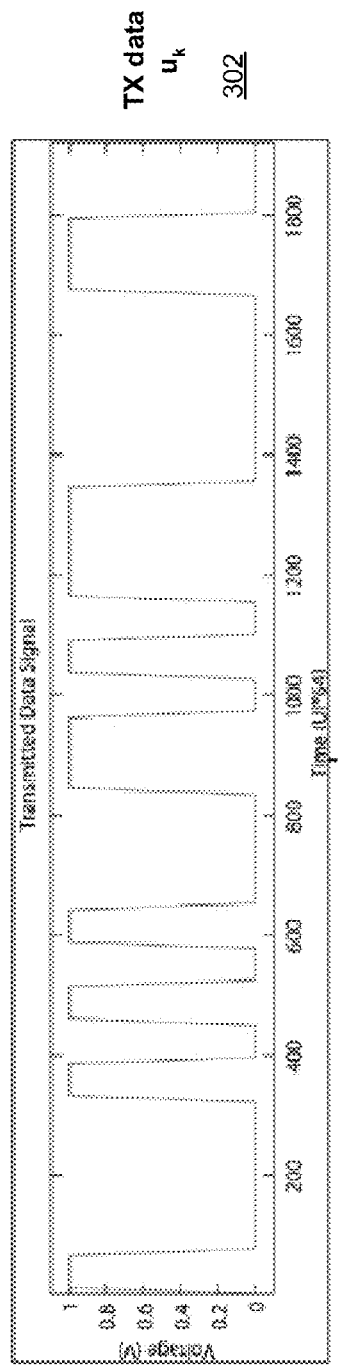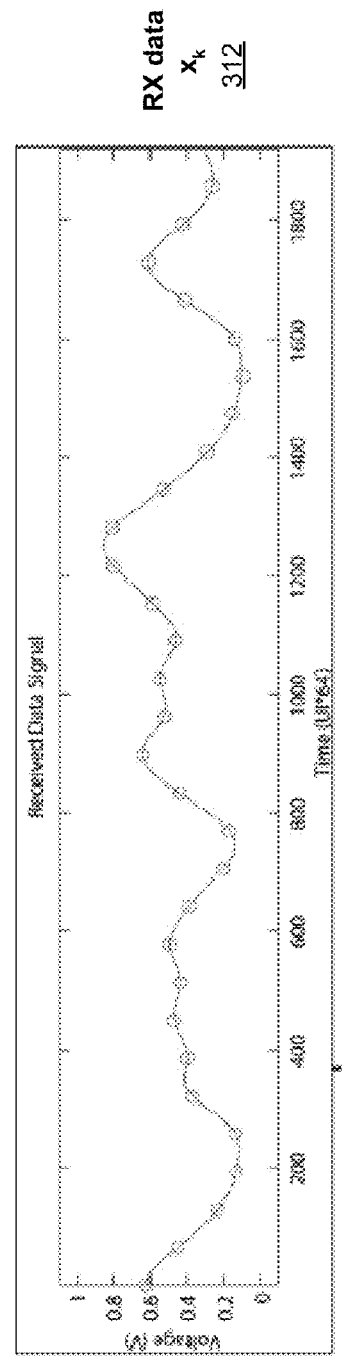
FIG. 3A
FIG. 3B

400

800

900

1000

1100

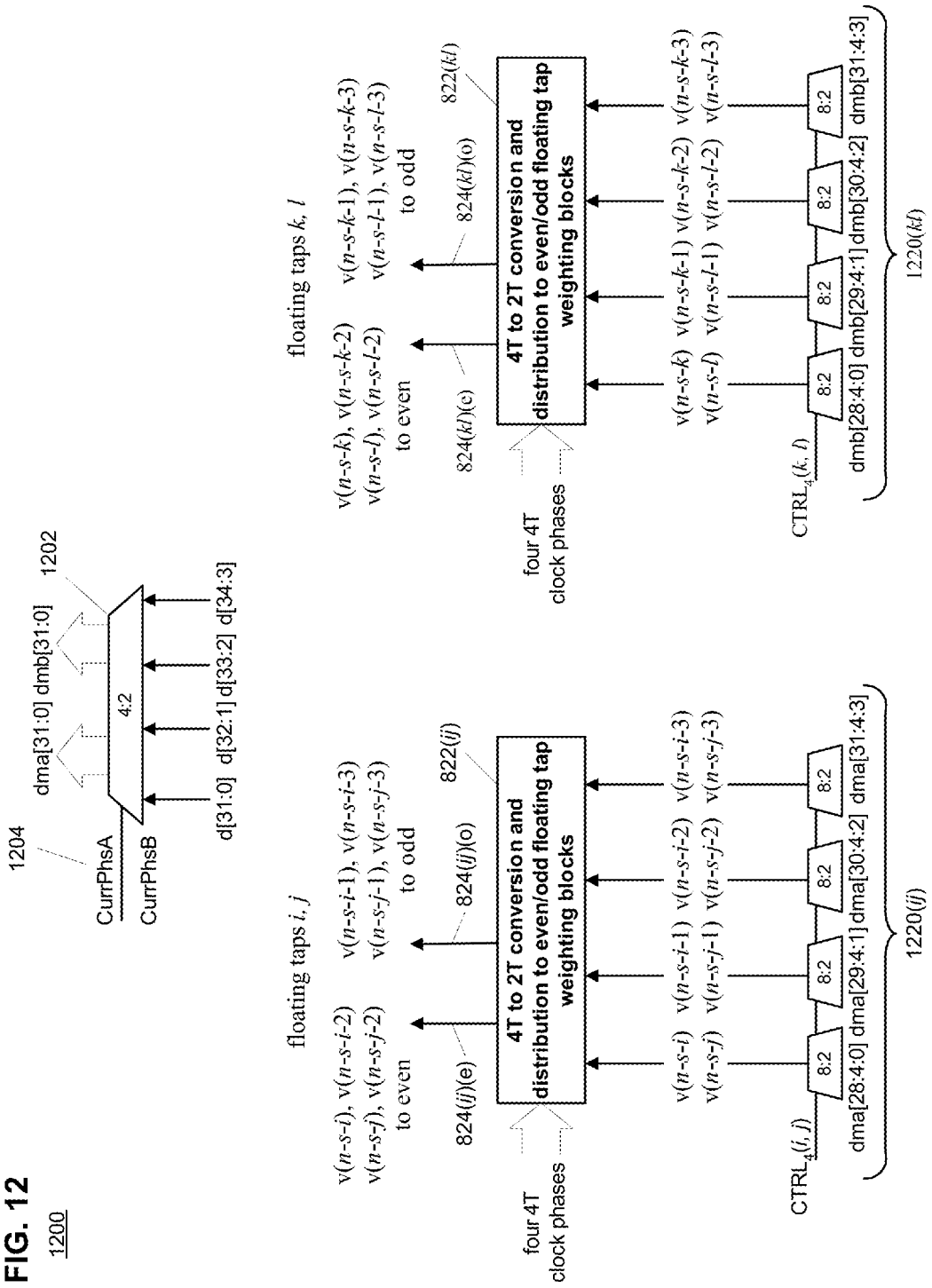

US 8,743,945 B2

SHIFT REGISTER BASED DOWNSAMPLED FLOATING TAP DECISION FEEDBACK EQUALIZATION

CROSS-REFERENCE TO RELATED APPLICATIONS

This application is a continuation-in-part and claims the benefit of the filing date, of U.S. patent application Ser. No. 13/410,735, filed on Mar. 2, 2012 now U.S. Pat. No. 8,537,885, the teachings of which are incorporated herein by reference.

This application is related to U.S. patent application Ser. No. 11/777,337, filed Jul. 13, 2007 and issued on Feb. 21, 2012 as U.S. Pat. No. 8,121,183, U.S. patent application Ser. No. 12/834,913, filed Jul. 13, 2010, and U.S. patent application Ser. No. 13/231,097, filed Sep. 13, 2011, the teachings of all of which are incorporated herein in their entireties by reference.

BACKGROUND

In many data communication applications, serializer and de-serializer (SERDES) devices facilitate the transmission of parallel data between two points across a serial link. Data at one point is converted from parallel data to serial data and transmitted through a communications channel to the second point where it received and converted from serial data to parallel data.

At high data rates frequency-dependent signal loss from the communications channel (the signal path between the two end points of a serial link), as well as signal dispersion and distortion, can occur. Ideally, without noise, jitter, and other loss and dispersion effects, a data eye at the receiver will exhibit a relatively ideal shape. In practice, the shape of the data eye changes with noise, jitter, other loss and dispersion effects, and with temperature and voltage variations. As such, the communications channel, whether wired, optical, or wireless, acts as a filter and might be modeled in the frequency domain with a transfer function. Correction for frequency dependent losses of the communications channel, and other forms of signal degradation, often requires signal equalization of the signal at a receiver.

Equalization through use of one or more equalizers compensates for the signal degradation to improve communication quality. Equalization may also be employed at the transmit side to pre-condition the signal. Equalization, a form of filtering, generally requires some estimate of the transfer function of the channel to set its filter parameters. However, in many cases, the specific frequency-dependent signal degradation characteristics of a communications channel are unknown, and often vary with time. In such cases, an equalizer with adaptive setting of parameters providing sufficient adjustable range might be employed to mitigate the signal degradation of the signal transmitted through the communications channel. Equalization might be through a front end equalizer, a feedback equalizer, or some combination of both. The shape of the data eye also changes due to equalization applied to input signal of the receiver. In some systems, equalization applied by a transmitter's equalizer further alters the shape of the eye from the ideal.

If a simple, analog front-end equalizer (AFE) is employed, the data eye operating margin improves. However, better performance might be achieved through use of a Decision Feedback Equalizer (DFE) in combination with an AFE. Classical DFE equalization optimizes for intersymbol interference (ISI) and opens up the vertical and horizontal data eye opening. In SERDES communication channels, DFE filtering is employed to cancel post-cursor ISI in the equalized channel's pulse response by subtracting the output of the DFE from an input signal. DFE filters include a number of taps, the number of which determines how well the post-cursor ISI might be cancelled. The longer the filter length (i.e., the more filter taps), the more ISI terms might be cancelled, but at the expense of increasing DFE filter complexity and power consumption.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments receive a signal by a set of fixed taps and a set of floating taps of a receiver. Each tap corresponds to a detected symbol. Each of the floating tap detected symbols are stored in a corresponding shift register to account for process, operating voltage and temperature (PVT) variations of the receiver without calibration of delay elements of the receiver. Multiplexing logic selects (i) corresponding floating taps for equalization by coupling selected outputs of the floating taps to the outputs of the fixed taps, and (ii) different phases of each possible floating tap position. The multiplexing logic prunes and/or amalgamates the phases of each possible floating tap position and selects corresponding floating taps based on a magnitude of each phase. A combiner adjusts each output value of the fixed taps and each output value of the selected floating taps by a corresponding tap-weight coefficient, combines the adjusted values into an output signal and subtracts the output signal from input signal.

BRIEF DESCRIPTION OF THE DRAWING FIGURES

Other aspects, features, and advantages of the present invention will become more fully apparent from the following detailed description, the appended claims, and the accompanying drawings in which like reference numerals identify similar or identical elements.

FIG. 3A shows an exemplary transmit data signal of the transmitter of the SERDES system of FIG. 1;

FIG. 3B shows an exemplary receive data signal of the receiver of the SERDES system of FIG. 1;

FIG. 12 shows an exemplary block diagram of a down-sampled prulgamation floating-tap DFE architecture.

DETAILED DESCRIPTION

In accordance with exemplary embodiments, a variety of downsampling techniques within a Decision Feedback Equalizer (DFE) are employed to generate a more constrained set of floating-tap positions when compared to floating-tap DFE architectures that allow unconstrained 1T resolution or separated floating-tap positions. This more constrained set of floating-tap positions might yield a better performance versus power tradeoff for a given implementation. Downsampling is employed to constrain the floating-tap positions rather than with positions occurring with 1T resolution or spacing. Two broad downsampling techniques, phase pruning and phase amalgamation, might be employed to select floating-tap positions containing dominant inter-symbol interference (ISI) terms. Embodiments might cancel relatively large post-cursor ISI terms with the constrained floating taps while also requiring fewer circuit elements and employing lower clock rates, providing for a reduction in power consumption versus other DFE architectures. Described embodiments might employ digital shift registers (or arrays of digital flip-flops) to store delayed floating-tap data, which might reduce or eliminate calibrating analog delay elements to account for process, operating voltage and temperature (PVT) variations of each integrated circuit (IC) Of system-on-chip (SoC). The shift registers might also be clocked at lower rates than the full symbol rate.

Table 1 summarizes a list of acronyms employed throughout this specification as an aid to understanding the described embodiments of the invention:

TABLE 1

| SERDES | Serializer / Deserializer | IC | Integrated Circuit |
| --- | --- | --- | --- |
| FIR | Finite Impulse Response | AFE | Analog Front End |
| CDR | Clock and Data Recovery | DFE | Decision Feedback Equalizer |
| BER | Bit Error Rate | DAC | Digital to Analog Converter |
| ADC | Analog to Digital Converter | ISI | Intersymbol Interference |
| FFE | Feed Forward Equalizer | DBE | Digital Back End |
| UI | Unit Interval | RF | Radio Frequency |
| NRZ | Non-Return to Zero | AEQ | Analog Equalizer |
| PCIE | Peripheral Component Interconnect Express | PAM | Pulse Amplitude Modulation |
| SoC | System on Chip | PVT | Process, Voltage, Temperature |

Figure 1:
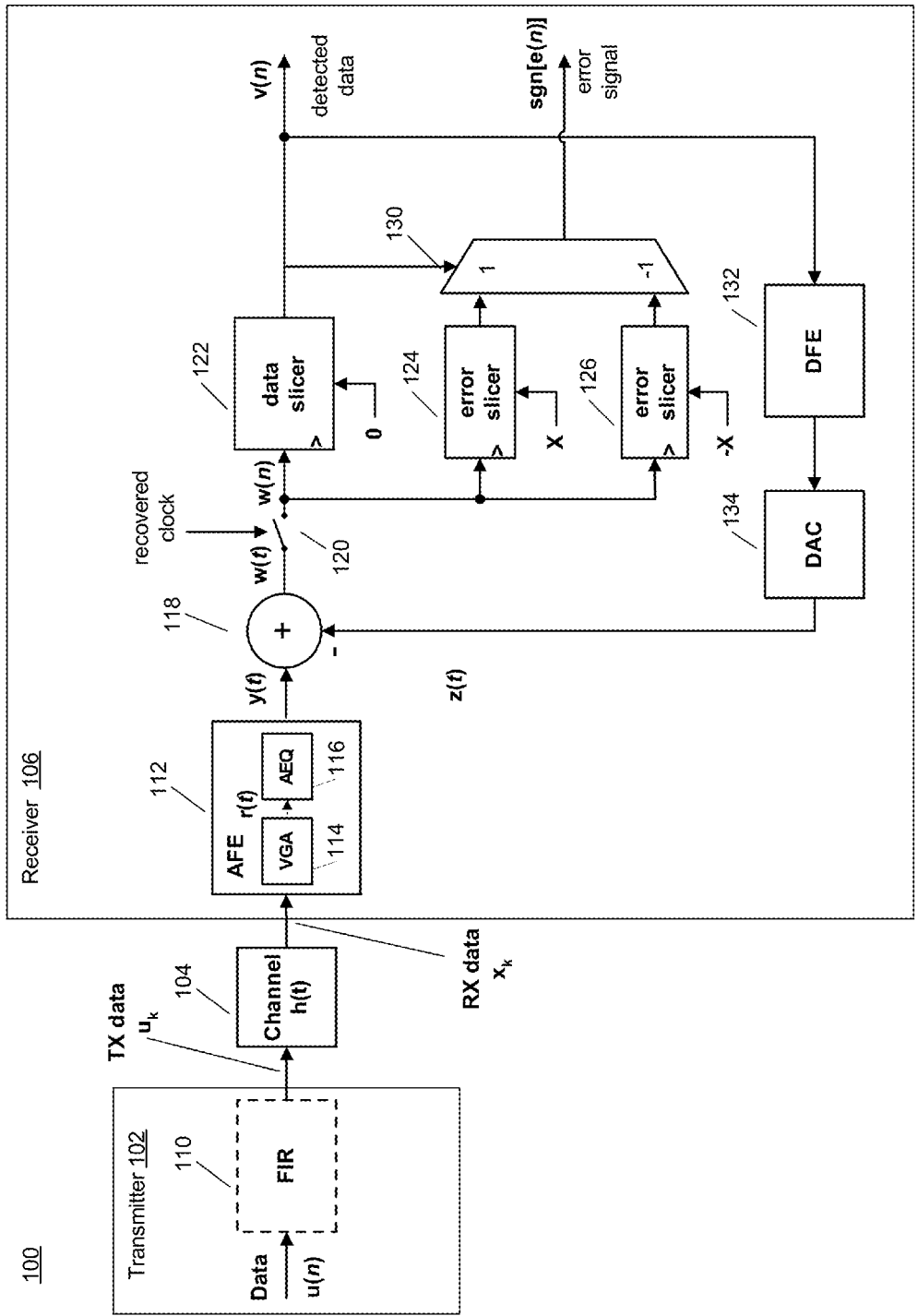
FIG. 1 shows a high level block diagram of a SERDES communication system employing transmit (TX) equalization, receive (RX) analog equalization (AEQ) as well as decision feedback equalization (DFE) to detect data bits v(n)

FIG. 1 shows a block diagram of exemplary serializer-deserializer (SERDES) communication system 100. As shown in FIG. 1, SERDES system 100 includes transmitter 102, communication channel 104 and receiver 106. As shown, transmitter 102 might optionally include finite impulse response (FIR) filter 110 for conditioning data before transmission to communication channel 104. In some embodiments, the function of FIR 110 might optionally be moved from transmitter 102 to receiver 106. Transmitter 102 provides data u(n) as a transmit signal as serial data bits, $u_k$, via communication channel 104, to receiver 106. Communication channel 104 might typically be a physical transmission medium, such as a backplane, drive head in a magnetic recording system, copper cables, or optical fibers. Although described herein as being employed in a SERDES communication system, described embodiments are not so limited, and some embodiments might be employed in alternative communications systems employing a transmitter and a receiver communicating over a communication channel. The communication channel might be at least one of fiber optics, one or more coaxial cables, one or more twisted pair copper wires, and/or one or more radio frequency (RF) channels. Additionally, various signal modulation and de-modulation techniques might be employed. Further, although described herein as each "bit" of a signal having a corresponding logic value, it is understood that the various signals described herein might employ multi-bit data symbols based on various data encoding schemes, such as pulse amplitude modulation (e.g., PAM-4). Further, signal amplitudes might be expressed herein as −1 to 1 such as for Non-Return to Zero (NRZ) signaling, although any signal encoding scheme might be employed.

After passing though communication channel 104, the analog transmit signal might be filtered or equalized by analog front end (AFE) 112 of receiver 106. AFE 112 might comprise a variable gain amplifier (VGA) to amplify the received signal, shown as VGA 114, and a continuous time analog filter, shown as analog equalizer (AEQ) 116. The analog signal output of AEQ 116, y(t), is given by relation (1):

$$z(t) = r(t) \star h_A(t) \tag{1}$$

where ★ denotes the continuous time convolution operation, r(t) is the signal received by receiver 106, and $h_A(t)$ is impulse response of AEQ 116. The post-DFE equalized signal input to data slicer 122 is shown as w(t) prior to sampling, and w(n) after sampling, with the sampling operation represented in simplified form by switch 120. Decision feedback equalization (DFE) 132 generates a DFE correction signal based on the data detected by data slicer 122. The output of AEQ 116 might be provided to an optional feed forward equalizer (FFE) (not shown) employed to reduce precursor ISI. DFE 132 generates equalized output based on one or more previous data decisions of data slicer 122 and pulse response coefficients (taps) corresponding to communication channel 104. DFE 132 might provide a control signal to adjust the operation of AFE 112 and one or more of data slicer 122 and error slicers 124 and 126.

The DFE correction signal is converted to a continuous time analog signal by digital-to-analog (DAC) converter 134. The analog correction signal, z(t), is subtracted at analog summer 118 from the output signal, y(t), of AFE 112 to produce DFE corrected signal w(t), where w(t) is given by relation (2):

$$w(t) = y(t) - z(t) \tag{2}$$

DFE corrected signal w(t) is sampled by switch 120 to produce sampled signal w(n), where w(n) is given by relation (3):

$$w(n) = w(nT) \tag{3}$$

where T is the baud period and n is the sample number. Many possible implementations for the sampling operation are known, for example by clocking data slicer 122 with a recovered clock generated from the received data by a clock recovery circuit (not shown) which might often be implemented as an adaptive feedback circuit to adjust the phase and frequency for sampling the analog waveform to allow proper data detection. Sampled signal w(n) is sliced by data slicer 122 to produce detected data v(n). Detected data v(t) sampled by data slicer 122 might typically be provided to subsequent modules (not shown) of receiver 106 for further processing.

Data slicer 122 compares input samples (e.g., in the digital domain) to a threshold, such as a zero-value threshold as shown, using the recovered clock. Data slicer 122 might typically be implemented as a decision device based on an amplitude threshold, but might also be a more complicated detector such as an analog to digital converter (ADC) (not shown) and a sequence detector (not shown). Data slicer 122 produces a binary version of w(n) or a quantized version of w(n). If an ADC is employed, a multi-bit value is produced. For high speed applications, data slicer 122 might be clocked by the recovered clock. Data slicer 122 quantizes the input signal to a binary "1" or "0" based on the sampled analog value and a slicer threshold, $s_t$. If the input to data slicer 122 at time n is w(n), then the output, v(n), of data slicer 112 is given by relation (4):

$$v(n)=1 \text{ if } w(n) > s_t,$$

$$\text{otherwise}, v(n)=-1 \text{ if } w(n) \leq s_t \quad (4)$$

Output signal v(n) is provided to DFE filter 132 to produce the filtered DFE output z(n), which is given by relation (5):

$$z(n) = \sum_{l=1}^{L} b(l)v(n-l) \quad (5)$$

where b(l) represents the DFE tap coefficients.

A set of additional data slicers, shown as error slicer 124 and error slicer 126, having non-zero thresholds X and −X generate a signed version of the sampled error signal, e(n). Since equalization opens up the vertical and horizontal data eye opening, error slicers 124 and 126, and multiplexor (MUX) 130 are employed to sample the data eye and generate the error value sign (sgn[e(n)]) corresponding to the sampling error e(n), which might be employed to adjust sampling phase of received data, as well as to adapt equalizer parameters (e.g., of AFE 112 or FIR 110) and taps of DFE 132.

Figure 2:
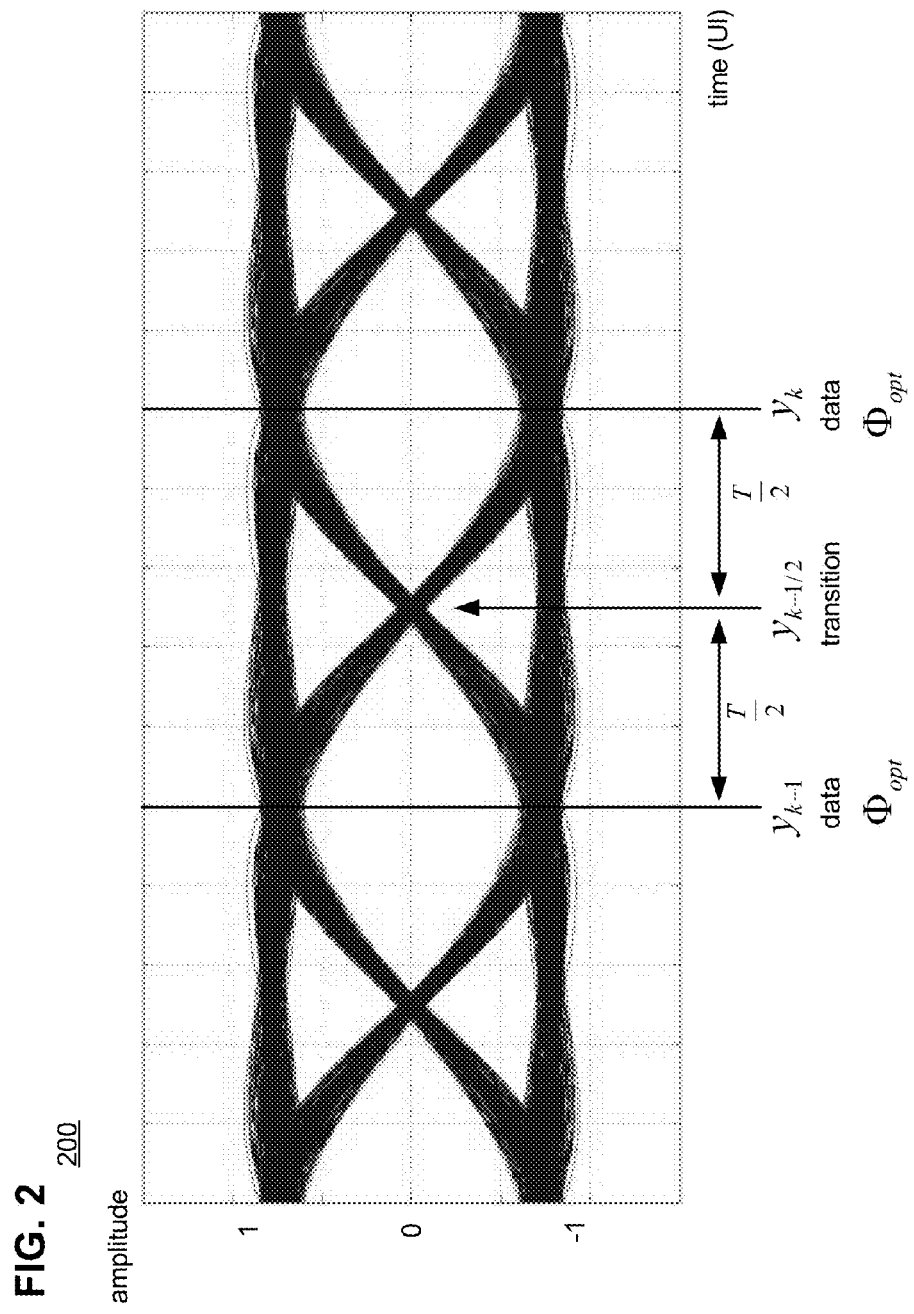
FIG. 2 shows an exemplary eye diagram of the receiver of the SERDES system of FIG. 1.

FIG. 2 shows a plot of exemplary data eye 200 of receiver 106. Data eye 200 illustrates super-positions of many data eyes of signal transitions expressed in amplitude versus time in UI. The data eye is created as received signals transition from low to low, low to high, high to low and high to high. Transitions from low to high and high to low might also be termed a transition or crossing point. Receiver 106 detects timing of the received data stream and uses the detected timing to correct the frequency and phase for sampling the received data. As shown in FIG. 2, for baud-rate circuits, the received signal is sampled once every UI ($y_{k-1}$, and $y_k$). Alternatively, for over-clocked circuits, such as bang-bang circuits, the received signal is sampled twice every UI, one sample at a crossing point ($y_{k-1/2}$) and another sample at the center of the data eye ($y_k$). Two consecutive data samples, ($y_{k-1}$ and $y_k$), and a crossing sample between them, ($y_{k-1/2}$), might then be used to decide whether the current sampling phase is lagging or leading the ideal sampling point.

Due to the channel pulse response, h(t), of communication channel 104, the transmitted signal bits, $u_k$, are received by receiver 106 as receive data bits $x_k$. FIG. 3A shows a plot of exemplary transmitted data signal, $u_k$ 302, voltage versus time in unit intervals (UI), where a UI corresponds to a symbol period. FIG. 3B shows a plot of received data signal, $x_k$ 312, corresponding to transmitted signal $u_k$ 302 for an exemplary communication channel 104. As shown in FIGS. 3A and 3B, received data signal $x_k$ 312 might not be identical to transmitted data signal $u_k$ 302, for example due to intersymbol interference (ISI) based on the pulse response h(t) of communication channel 104.

Figure 4:
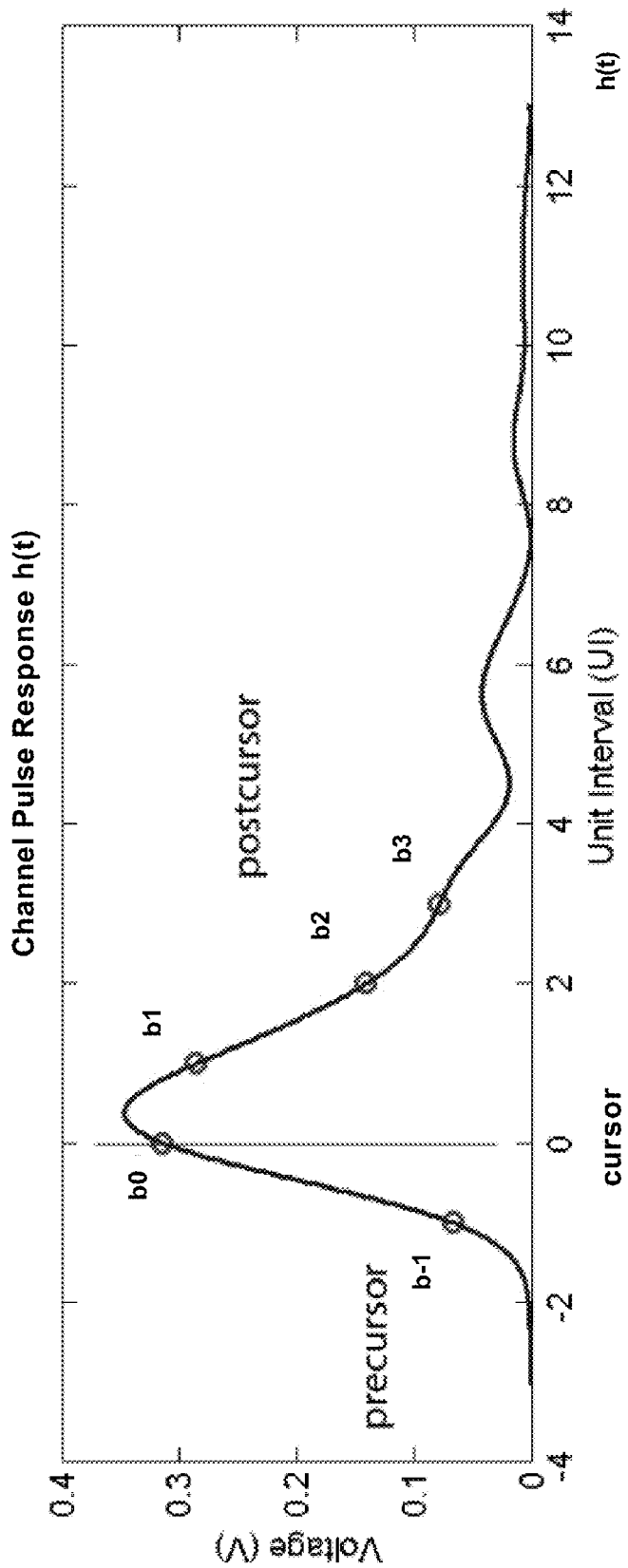
FIG. 4 shows an exemplary plot of the pulse response of the communication channel of the SERDES system of FIG. 1.

FIG. 4 shows an exemplary plot 400 of the voltage over time of channel pulse response h(t) of communication channel 104 at receiver 106. Channel pulse response h(t) is the result of transmitting an approximately rectangular pulse (with finite rise and fall times and neglecting pre-emphasis) from transmitter 102. As shown in FIG. 4, each data pulse transmitted over communication channel 104 generates pulse response h(t) received at receiver 106, pulse response h(t) includes a pre-cursor ISI component ($b_{-1}$) in the before the pulse, the cursor component ($b_0$) at the UI of the pulse, and one or more post-cursor ISI components ($b_1$, $b_2$, $b_3$) at UIs following the pulse. As multiple pulses are transmitted over communication channel 104 at high data rates (e.g., the exemplary transmitted data signal $u_k$ of FIG. 3A), the overlapping in time of received symbols leads to ISI between each pulse as ISI contributions from previous symbols can add or subtract from the voltage amplitude of the current symbol (e.g., the exemplary received data signal $x_k$ of FIG. 3B). DFE 132 and summer 118 subtract the SUM of the ISI contributions for a predetermined number of previously received symbols from the received signal by multiplying the previously received symbol values with their corresponding tap values, summing the products, and subtracting them from the received signal. The tap values might be chosen or adapted such that they match or approximate the corresponding pulse response values.

Figure 5:
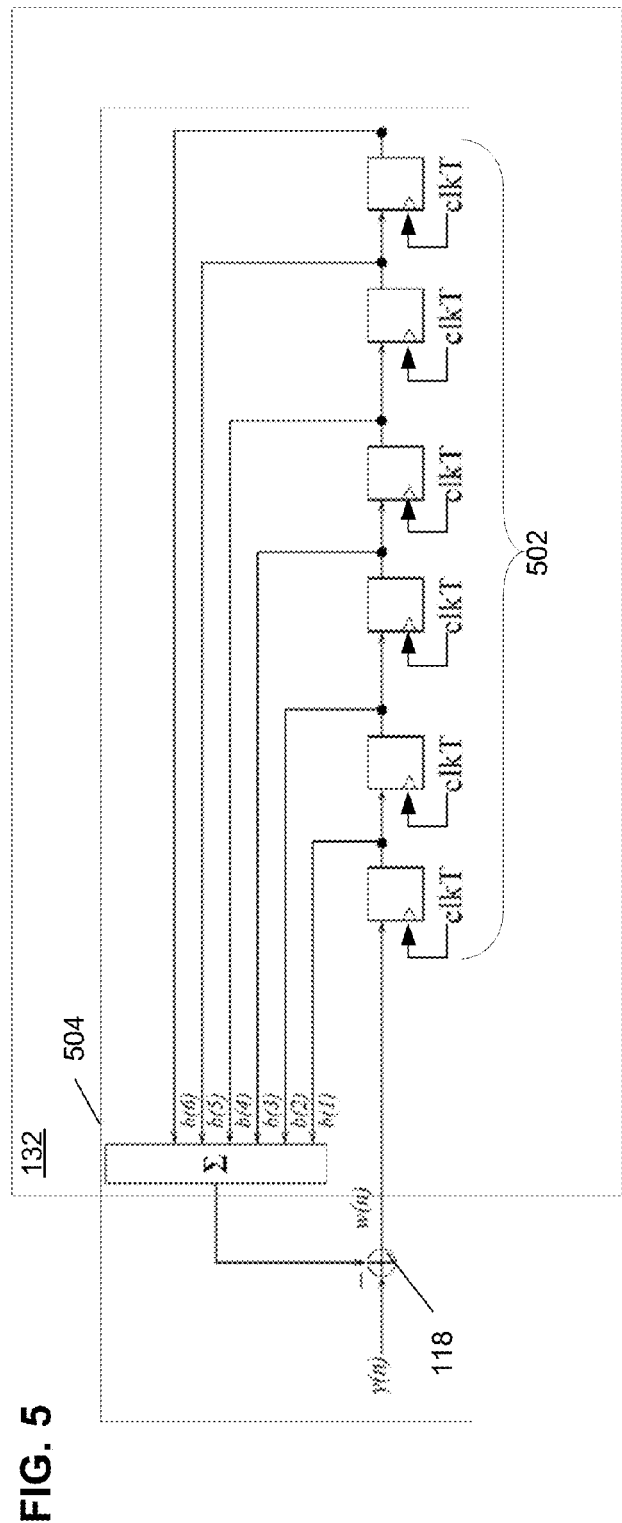
FIG. 5 shows a block diagram of a 6 tap DFE, filter implementation.

FIG. 5 shows a block diagram of an exemplary 6 tap DFE filter implementation. The 6 tap DFE filter comprises 6 series-coupled latches (or flip-flops) 502, and has 6 coefficients b(1) through b(6) with which the latch outputs are weighted before the weighted outputs are combined in summing node 504. The output of summing node 504 is used to subtract the overall DFE output from the input signal y(n) by summer 118 in the sampling domain, or in the analog domain from y(t) by applying the output of summing node 504 to digital-to-analog converter (DAC) 134.

Since the decision process typically exhibits a practical delay of 1T, in practice, the first decision that is produced is v(n−1), relative to the input signal y(n) and time n. This DFE architecture of FIG. 2 is an example of a 'fixed' tap architecture having 6 fixed DFE taps. If the number of DFE taps increases for a given architecture to, for example, a span of 38 taps to cancel ISI terms at higher tap locations, such as positions 36, 37, 38, then a 38-tap DFE filter having 38 latches and corresponding coefficients might be required. The latches are clocked at the symbol or baud rate period T as indicated in the figures by signal clkT.

However, floating-tap DFE filters offer a method to efficiently cancel reflection based ISI at higher taps by allowing the taps to 'float' (i.e., take on only certain positions where they provide relatively best performance). A full latch structure of up to 38 latches is still required. However, if a design desires to cover only a few reflections at high tap positions, only those taps are used at the desired selected positions. Such an adaptive, floating-tap DFE is described in United States Patent Application Publication No. US 2009/0016422, filed Jul. 13, 2007, published Jan. 15, 2009, entitled "System for an Adaptive Floating Tap Decision Feedback Equalizer", commonly owned by the assignee of the present invention, and the teachings of which are incorporated herein in their entirety by reference.

Figure 6:
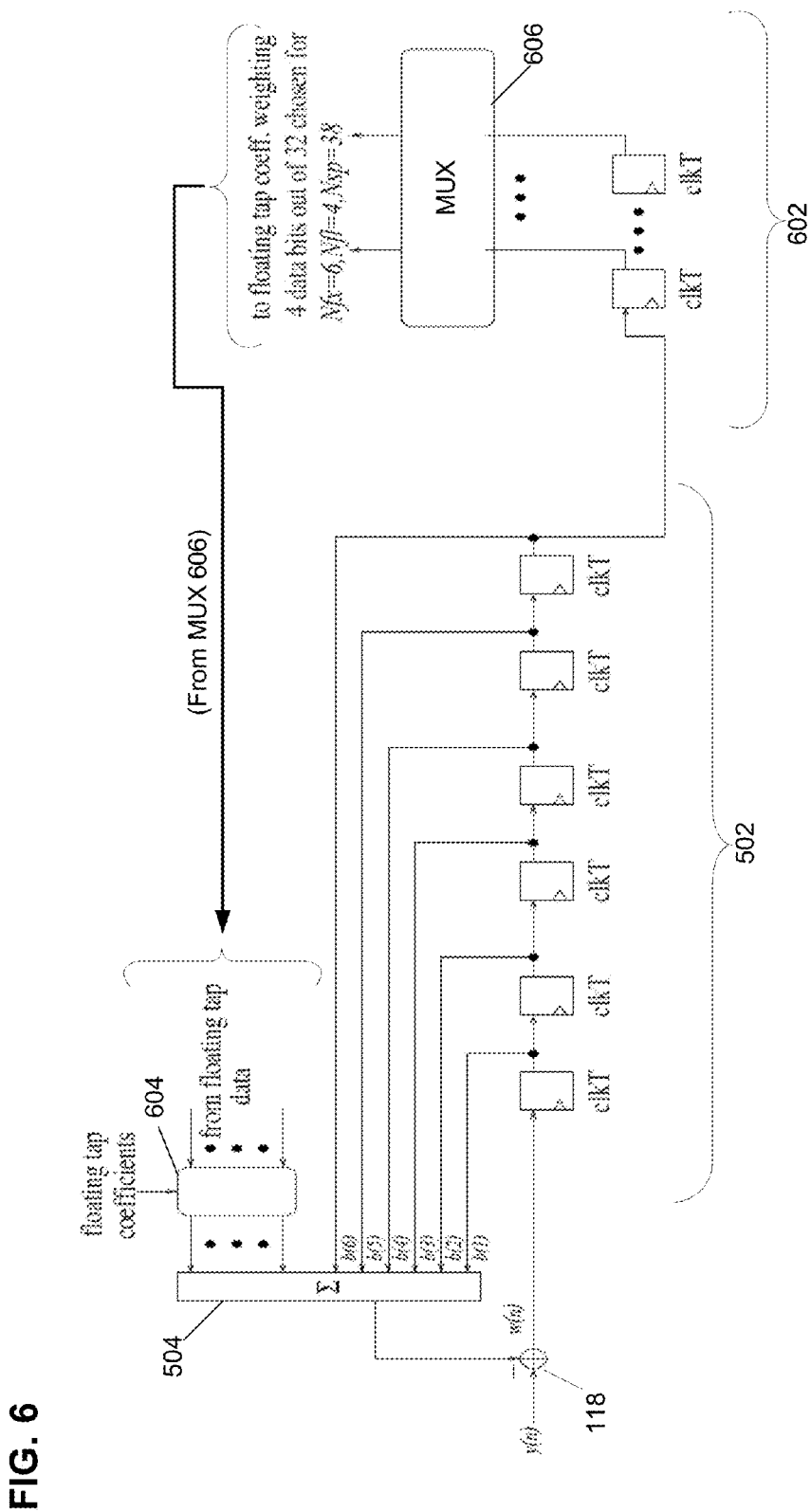
FIG. 6 shows a block diagram of a floating-tap DEE architecture with 6 fixed taps and 4 floating taps configured for positions up to 38T.

FIG. 6 shows a block diagram of floating-tap DFE architecture based on the fixed tap architecture shown in FIG. 5 with 6 fixed taps 502 and 4 floating taps selected from 32 taps.

Therefore, the floating-tap DFE architecture of FIG. 6 is configured for positions up to 38T. MUX 606 receives the output of each of the chain of latches 602 (also clocked at period clkT) and selects the outputs of the four floating taps. The outputs of the four floating taps from MUX 606 are weighted in weighting circuitry 604 and then provided to combiner 504.

For FIG. 6, the following notation might be employed: Nfx is defined as the number of fixed taps; Nsp is the floating-tap span, and Nfl is defined as the number of floating taps. The DFE equalized sampled signal w(n) is as given in relation (6):

$$w(n) = y(n) - \sum_{l=1}^{Nfx} b(l)v(n-1) - \sum_{l=l_1}^{l_{Nfl}} b(l)v(n-1) \quad (6)$$

In the exemplary embodiment of FIG. 6, Nfx=6, Nsp=38, and, for example, Nfl is set to 4 (i.e., 4 floating taps are employed). In this case, (Nsp−Nfx) latches are employed for the floating-tap section 602, which for the example of FIG. 6 is (38−6)=32 latches. Since the first 6 taps might be fixed, then tap positions beyond the sixth tap might be selected as floating taps, and, thus, the 4 floating taps might be selected from a total of 32 floating-tap positions (e.g., taps 7 through 38). Floating-tap positions $l_i$ are unconstrained and might span from i=(Nfx+1) to (Nsp) with 1T resolution. Each of Nfl floating taps might be selected from as many as (Nsp−Nfx) positions. The above relation (6) for a DFE architecture shows sampled signals y(n) and w(n) for simplicity. In practice, as described regarding FIG. 1, y(t) is typically a continuous time signal and the continuous time DFE equalized signal is w(t). For this continuous time signal case, w(n) is the sampled signal. Sampling of continuous time signals might be incorporated into the comparator clocking of the first latch in the DFE structure.

Although the floating-tap DFE architecture described with respect to FIG. 6 performs adequately, the floating-tap DFE architecture requires many latches as well as the corresponding circuits to pick latch data bits corresponding to 4 of 32 floating-tap positions. Therefore, a particular implementation of the floating-tap DFE architecture of FIG. 6 might consume considerable power, occupy relatively large area of an integrated circuit (IC) or system on chip (SoC) solution, and increased circuit complexity with corresponding signal timing delay factors.

Embodiments having a phase pruning, downsampled, floating-tap DFE architecture are described in greater detail in U.S. patent application Ser. No. 13/410,735, filed on Mar. 2, 2012, the teachings of which are incorporated herein by reference. Such described downsampled, floating-tap DFE architectures might employ pruning, amalgamation, and prulgamation (short for pruning-amalgamation), whereby the floating tap positions are constrained with little performance loss and reduced power consumption, circuit complexity and circuit size. Such DFE architectures employ analog delay elements to store delayed floating tap decision data. However, such DFE architectures might require calibration of the delay element delays (e.g., with a reference delay value) either during system start up, or periodically during system operation, to overcome a given device/chip process, operating voltage and temperature (PVT) variations.

Thus, it is advantageous to consider downsampled floating tap DFE architectures which employ digital shift registers (or arrays of digital flip-flops) to store the delayed floating-tap data to avoid having to calibrate the analog delay elements to account for PVT variations. Alternatively, a standard floating tap DFE might also beneficially employ a digital shift register for storing delayed floating-tap data. The digital shift register might be clocked at a lower rate, such as 4T instead of the full symbol rate T, versus the analog delay elements.

As described, downsampling techniques such as pruning, amalgamation and prulgamation, constrain the DFE floating-tap positions rather than allowing them to occur at arbitrary 1T spacing locations. In some embodiments, the DFE fixed taps might be implemented having a 2T-based DFE architecture, while the DFE floating-taps might be implemented having a lower rate 4T-based shift register architecture. One or more digital shift registers clocked at a 4T rate might store the delayed data for all possible floating-lap positions. Then, downsampling techniques might be applied to the stored floating-tap data.

Figure 7:
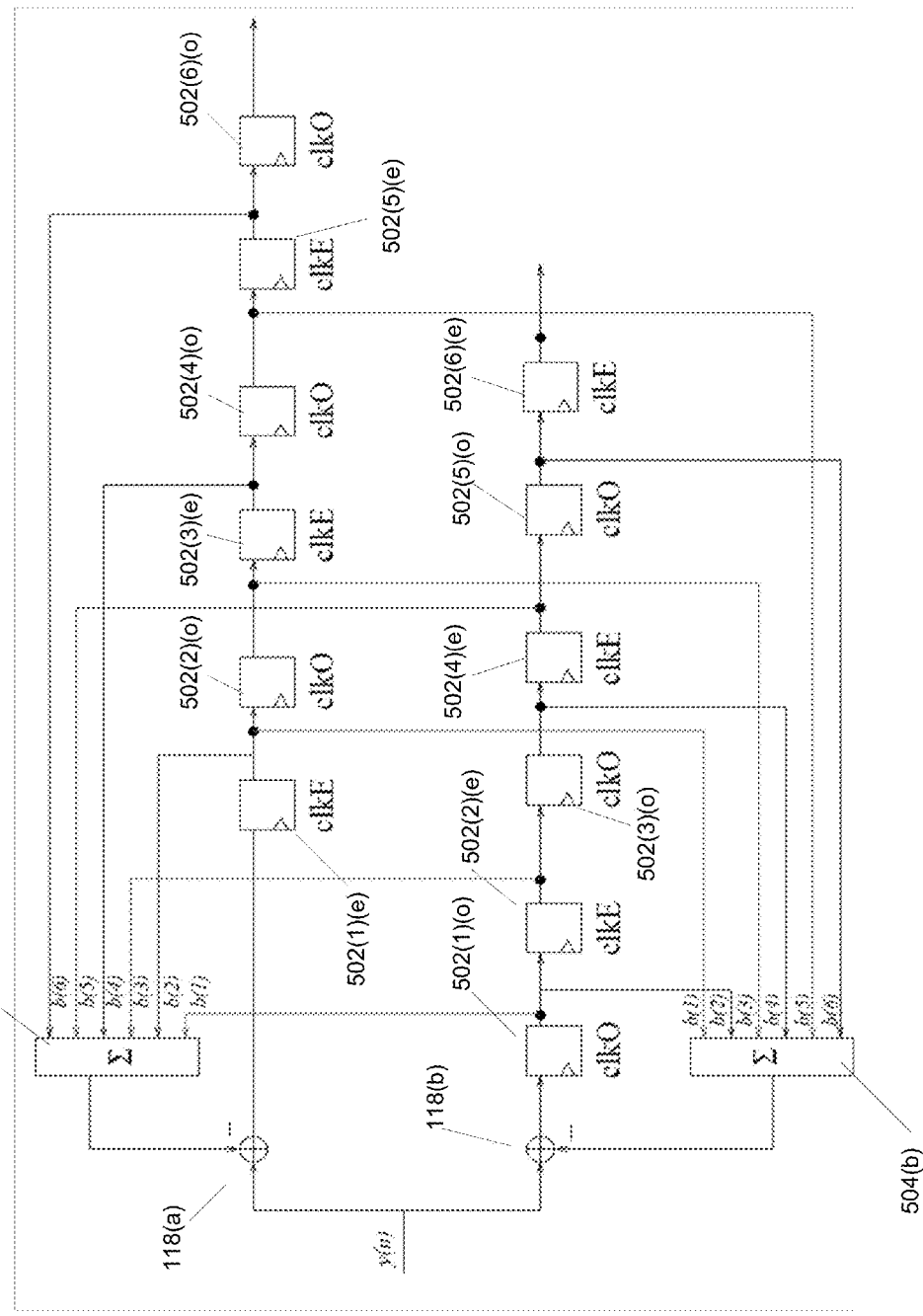
FIG. 7 shows an exemplary 2T-based feedback DFE architecture with 6 fixed taps.

FIG. 7 shows an embodiment of a DFE having a 2T-based feedback DFE architecture with 6 fixed taps. Some implementations based on the configuration of FIG. 7 might double the hardware and operate components at a lower speed of 2T. As shown, the configuration of FIG. 7 employs latches 502(*t*)(*e*) clocked at the even (clkE) transitions and latches 502(*t*)(*o*) clocked at the odd (clkO) transitions, providing the 2T timing, where t is the fixed tap number (e.g., 1-6).

Figure 8:
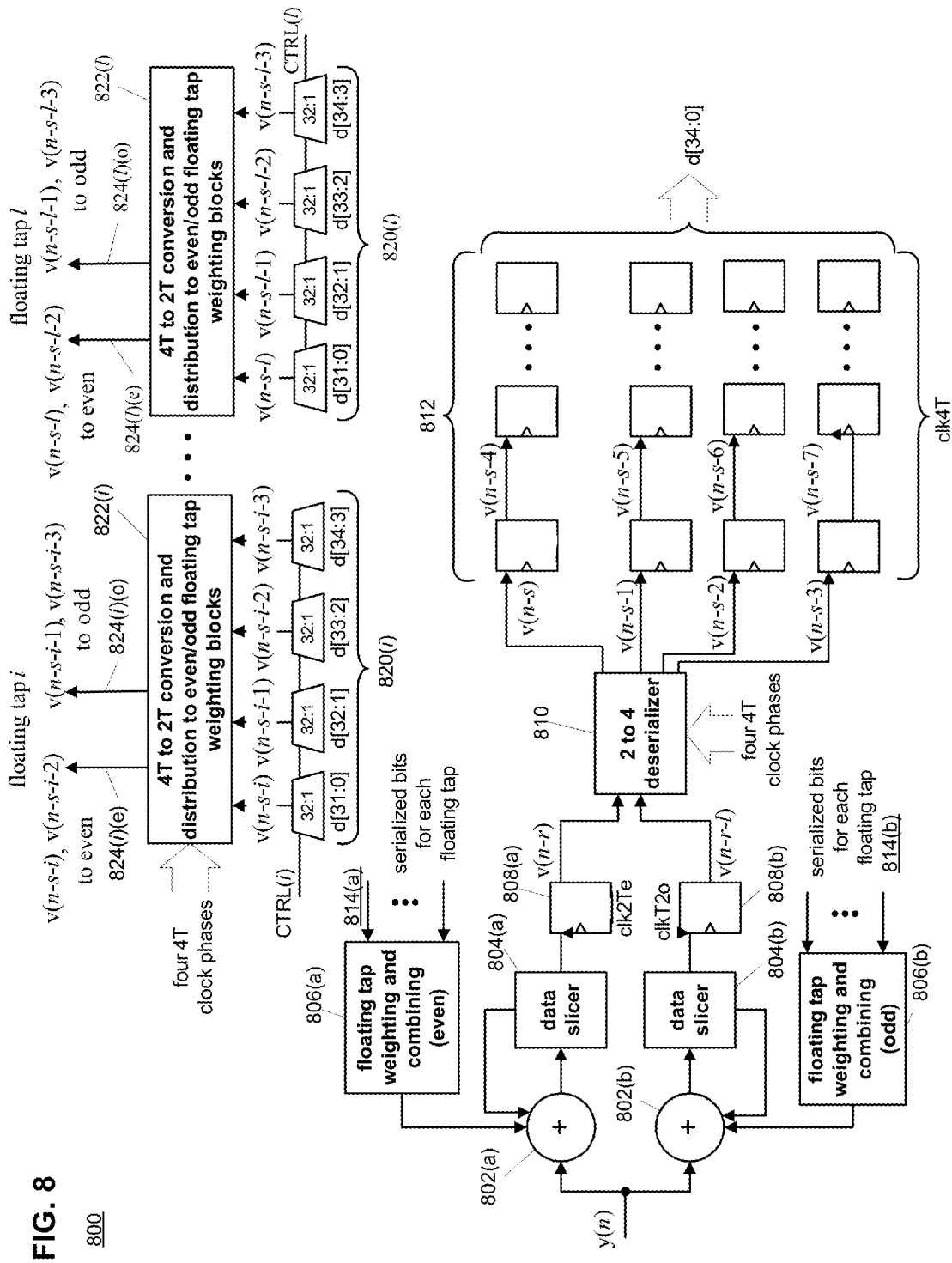
FIG. 8 shows an exemplary block diagram of a floating-tap DFE architecture.

FIG. 8 shows an exemplary block diagram of the floating-tap section of the DFE architecture. Details of the fixed-tap section are not shown in FIG. 8, and the fixed-tap data decisions are desirably known. As shown in FIG. 8, input data y(n) is split into even and odd data paths, for example an even data path via summer 802(*a*), data slicer 804(*a*) and register 808(*a*), and an odd data path via summer 802(*b*), data slicer 804(*b*) and register 808(*b*), which are clocked at a 2T rate (clk2Te and clk2To). Data decisions from both even and odd datapaths are processed through 2 to 4 deserializer 810 to generate data clocked at a 4T rate (clk4T). The 4 phases of a 4T clock, each separated by 1T, preserve all the data decision information with 1T resolution in time to produce data decisions v(n−s−1), v(n−s−2), v(n−s−3) and v(n−s−4). These data decisions are input to 4T shift register 812 to obtain the necessary delays across all the possible floating tap positions (e.g., the exemplary 32 floating-tap positions described herein).

For example, to support the 32 floating-tap positions described herein, 32 storage elements are generally required within shift register 812 to store delayed data corresponding to each tap position. However, since the floating tap shift register operates at a 4T clock that is fed back to input summing node 802 with 1T resolution, (e.g., a combination of even and odd 2T data), shift register 812 might include storage elements that store extra data bits to support the data history across a 4T clock period (e.g., there are 4 data bits per clock period, so 3 extra data bits might require storage). The aggregate of all the data bits are represented as d[34:0] output from shift register 812.

For example, in a full rate DFE architecture, example tap position 7 requires data v(n−7−1) be fed back the input summing node at time (n−1). At time n, data v(n−7−1) is automatically delayed to (n−7) in the full rate shift register to have the required timing alignment. However, if the data v(n−7−3) is clocked with a 4T clock shift register, data for times (n−2), (n−1), and (n), are not automatically delayed by the main 4T clock but are obtained from the other phases of 4T shift register 812 which are clocked with four 4T clocks (each phase separated by 1T). Thus, the complexity of floating tap mux 820 is actually quadruple, one for each of the four 4T clock phases. At different times, for example (n−3), (n−2), (n−1) and (n), the floating-tap operation be v(n−7−i) would be performed by a separate hardware path for each floating-tap, shown in FIG. 8 as blocks labeled floating tap i (e.g., 820(i), 822(i) and 824(i)) to floating tap l, (e.g., 820(l), 822(l) and 824(l)), representing each of the four floating taps i, j, k and l.

Data from shift register 812 is selected by mux 820 based on the choice of floating tap positions to be fed back to the fixed tap input stage. For the mux selection in a floating-tap section with 4 floating taps, a 32:4 MUX (or equivalently 4 parallel 32:1 muxes) selects data for each of the 4 floating tap positions. However, due to the quadrupling of hardware generally required to support the use of the 4T shift register derived data as described above, the standard floating tap implementation with the 4T shift register generally requires a total of sixteen 32:1 muxes, indicated in FIG. 8 as four mux group 820(i) for floating tap through four mux group 820(l) for floating tap l. Each mux group 820(i) through 820(l) receives a control signal corresponding to the tap number to select the corresponding data values. As shown in FIG. 8, blocks 822 convert the 4T data to 2T data, and provide data v(n−s−i) and v(n−s−i−2) to even floating tap weight and combination block 806(a) which weights and combines the floating-tap data for filtering post-cursor ISI out of the even received signal data at summer 802(a). Similarly, blocks 822 provide data v(n−s−i−1) and v(n−s−i−3) to odd floating tap weight and combination block 806(b) which weights and combines the floating-tap data for filtering post-cursor ISI out of the odd received signal data at summer 802(b).

Figure 9:
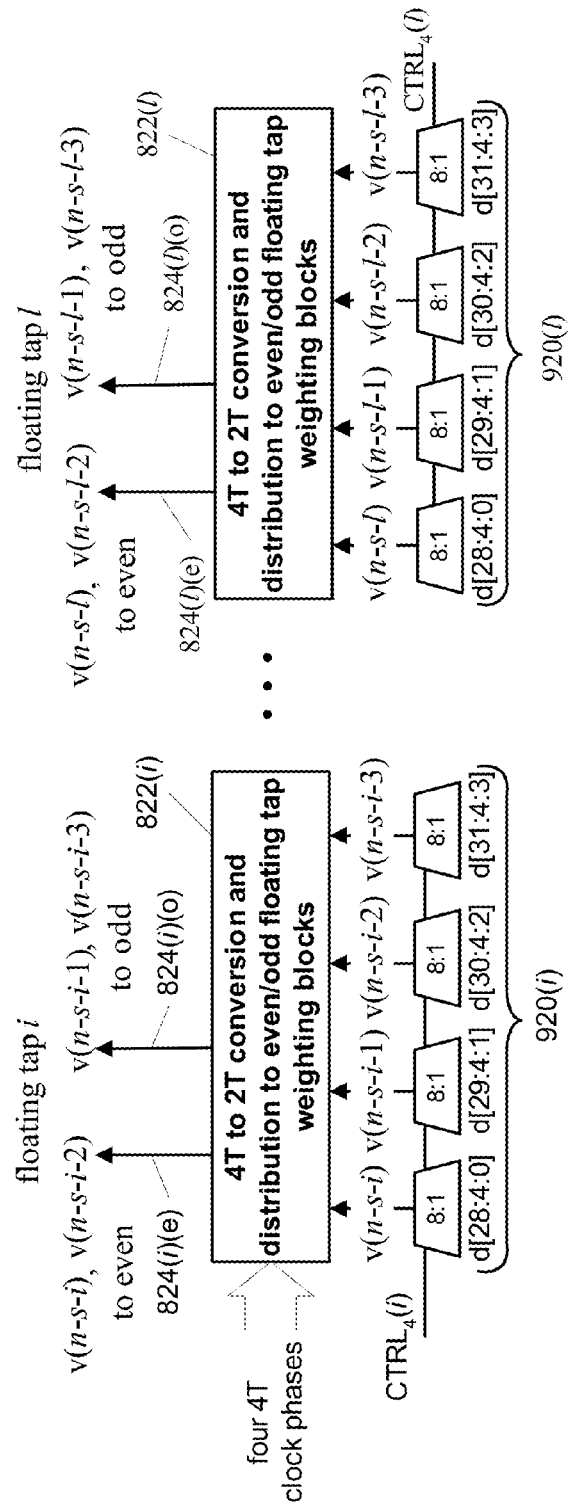
FIG. 9 shows an exemplary block diagram of a down-sampled pruning floating-tap DFE architecture.

FIG. 9 shows an exemplary block diagram of a multiplexing block of a downsampled amalgamation floating-tap DFE. Since the floating-tap position could occur on any phase, shift register 812 is unchanged from FIG. 8, and is thus not shown in FIG. 9. The mux hardware of FIG. 9 is quadrupled similarly as in FIG. 8, however, downsampling allows use of 8:1 muxes shown as mux groups 920(i) through 920(l). As described herein, the quadrupling of muxes for each tap position (e.g., having four 8:1 muxes for each tap position) ensures that the floating-tap feedback to the input stage occurs every 1T. As shown in FIG. 9, the control lines for each mux group 920 is not the corresponding tap number (as was the case in FIG. 8), but instead is a mux control number. Compared to the standard floating-tap DFE shown in FIG. 9, the downsampled amalgamation DFE employs sixteen 8:1 muxes (e.g., four muxes each group 920(i) through 920(l)) versus sixteen 32:1 muxes in the standard architecture. For the same data rate, this reduces the complexity and power consumption and also reduces the timing critical constraints through the muxes.

Figure 10A:
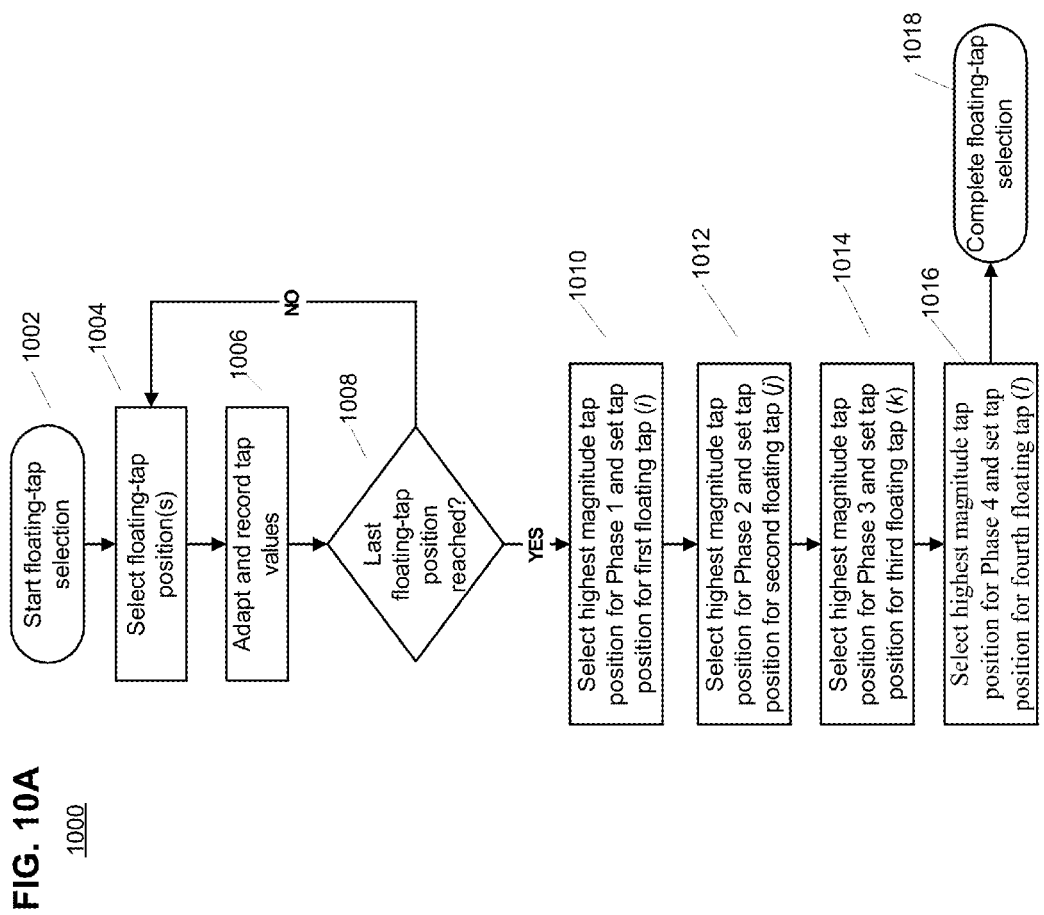
FIG. 10A shows an exemplary flow diagram of a floating tap selection process of the DFE.

FIG. 10A shows an exemplary flow diagram of floating-tap search sequence 1000 for amalgamation. Floating taps are at tap positions i, j, k, and l. In described embodiments, the floating-tap DFE performs a search to determine which floating-tap positions to employ to cancel post-cursor ISI from received data. Floating-tap selection process 1000 starts at step 1002, for example at a startup of the transmission system employing the DFE. At step 1004, a first set of floating taps are selected. For example, in a system employing 4 floating taps, bit values for floating tap positions 7, 8, 9 and 10 (e.g., the floating taps are offset by the 6 fixed taps might be selected as i, j, k and l. At step 1006, the tap values are adapted, and the magnitude of the received signal is recorded. At step 1008, if there are remaining floating tap positions to check, process 1000 returns to step 1004 to select the next set of floating taps (e.g., floating tap positions 11, 12, 13 and 14). If, at step 1008, there are no remaining floating taps to check, process 1000 proceeds to step 1010. At steps 1010 through 1016, the various recorded tap magnitudes are sorted from each phase and the tap positions from the 4T phases are amalgamated to become the overall set of floating tap positions. At step 1010, the highest magnitude tap position for Phase 1 is selected for floating tap i (e.g., from tap positions that are 4 apart, starting at 7, 11, 15, etc.). At step 1012, the highest magnitude tap position for Phase 2 is selected for floating tap j (e.g., from tap positions that are 4 apart, starting at 8, 12, 16, etc.). At step 1014, the highest magnitude tap position for Phase 3 is selected for floating tap k (e.g., from tap positions that are 4 apart, starting at 9, 13, 17, etc.). At step 1016, the highest magnitude tap position for Phase 4 is selected for floating tap l (e.g., from tap positions that are 4 apart, starting at 10, 14, 18, etc.).

Figure 11:
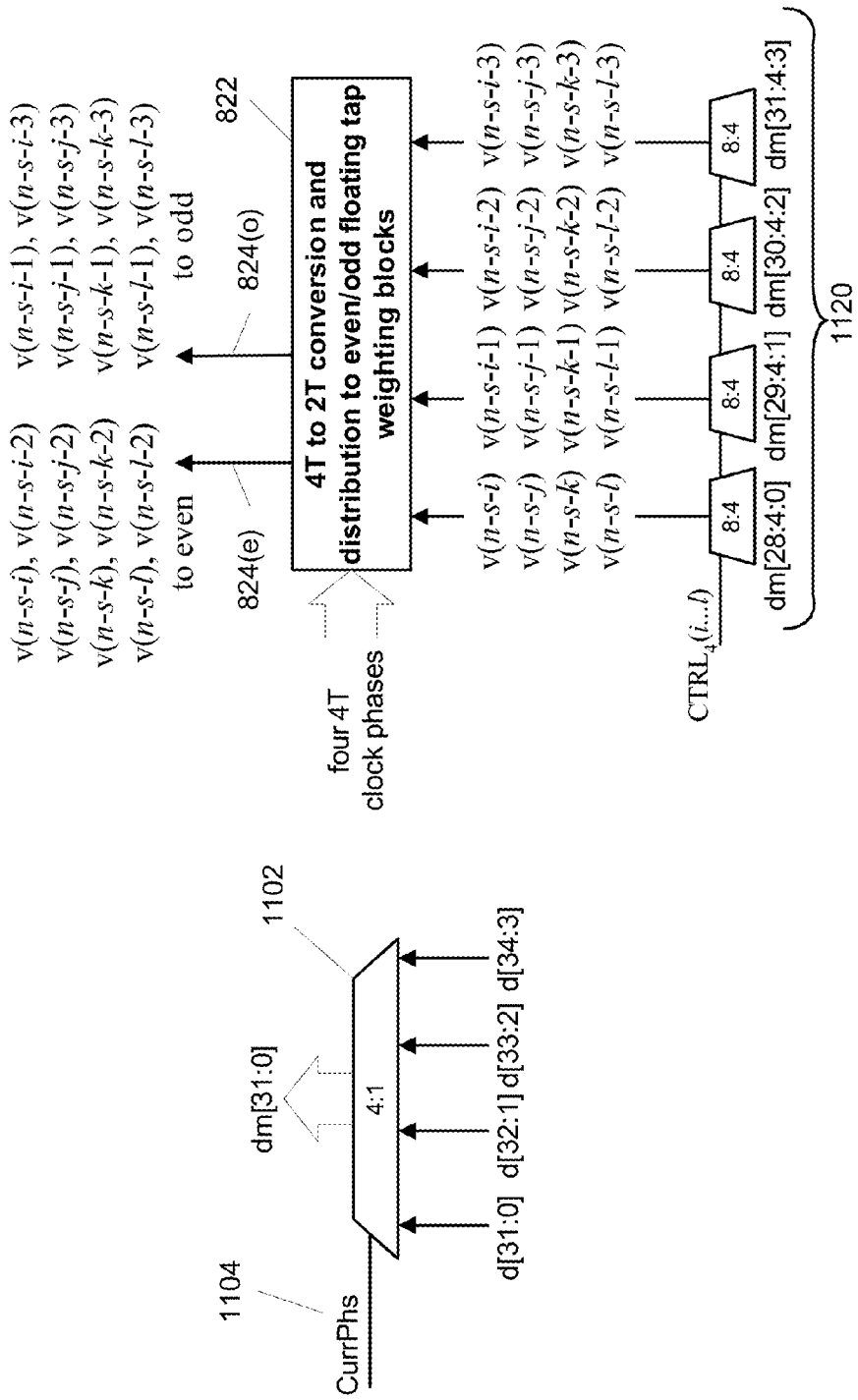
FIG. 11 shows an exemplary block diagram of a down-sampled pruning floating-tap DFE architecture.

As described above in regard to FIG. 10A, and as shown in FIGS. 11 and 12, the mux control number corresponding with various taps, rather than just the tap number, is provided to the muxes. The mapping for tap number to mux control number for the 4 muxes are provided in Table 2 below:

TABLE 2

| Phase | Tap position | Mux control value |
|---|---|---|
| Phase 1 | (i) 7, 11 … | (i): 0, 1 … 7 |
| Phase 2 | (j) 8, 12 … | (j): 0, 1 … 7 |
| Phase 3 | (k) 9, 13 … | (k): 0, 1 … 7 |
| Phase 4 | (l) 10, 14 … | (l): 0, 1 … 7 |

Figure 10B:
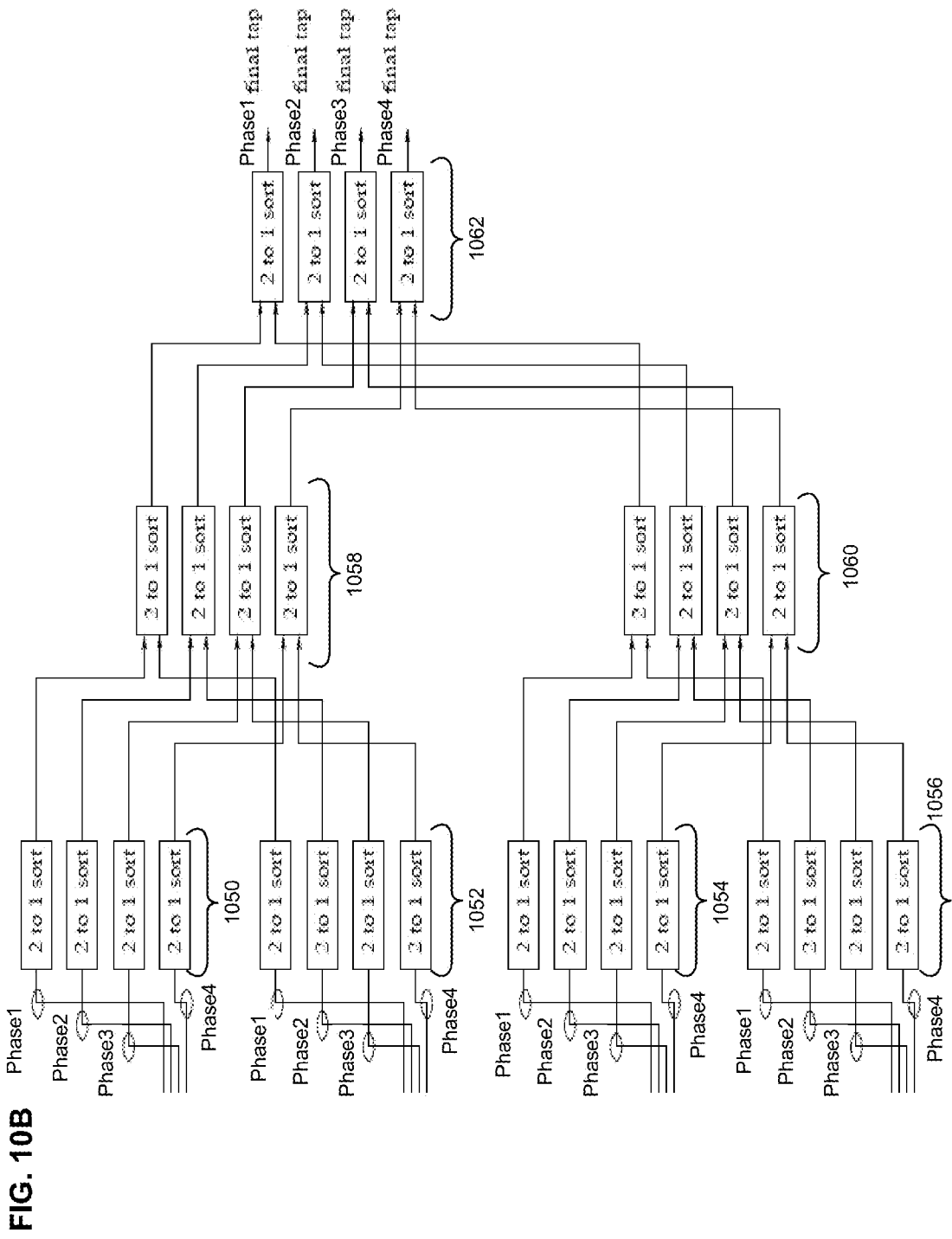
FIG. 10B shows an exemplary logic diagram of a sorting operation of the floating tap selection process of FIG. 10A.

Thus, as shown in FIG. 10A, the 4 floating taps chosen from the 32 candidate tap positions are the floating tap positions that offer the maximum magnitude of the received signal. Further, as shown in FIG. 10B the sorting can be simplified to employ 4 independent 8 to 1 sorting operations (shown in FIG. 10B as sorting blocks 1050, 1052, 1054, 1056, 1058, 1060 and 1062). Note that the 8 to 1 sorting operations might be split into 2 to 1 sort operations, since, once two taps have been obtained from each of the four phases, a 2 to 1 sort might be performed for each phase to select the best (maximum magnitude) (e.g., by sorting blocks 1050). Similarly, after two more taps have been obtained from each of the four phases, each phase can be sorted using 2 to 1 sort operations (e.g., sorting blocks 1052). The 2 to 1 sort operations continue until, a 2 to 1 sort can be performed for each of the phases to obtain the final best magnitude tap for each phase (e.g., sorting block 1062). Although shown as parallel 2 to 1 sort operations, in some embodiments, the sorting blocks might be shared or reused to varying degrees depending on storage, timing, and ease of control tradeoffs. For example, for each phase the current adapted tap magnitude might be compared with the previous adapted tap magnitude for that phase. Thus, the sorting might be performed sequentially for each phase requiring the use of only one, 2 to 1 sorter per phase.

FIG. 11 shows an exemplary block diagram of a downsampled pruning floating-tap DFE. As with amalgamation, the front end 4T shift register (812) is retained and is not shown. In the pruning DFE, only 1 of the 4 possible downsampled phases need be selected. This phase is selected by first stage 4:1 mux 1102 based on a value of CurrPhs control signal 1104. First stage mux 1102 selects the data bits corresponding to the selected phase from d[34:0]. In particular, mux 1102 selects one of d[31:0], d[32:1], d[33:2], or d[34:3]. The bits corresponding to the chosen phase are shown as bits dm[31:0]. From these bits now we need to choose 4 bits out of 8 corresponding with floating tap positions i, j, k, l which occur at 4T separation. Due to pruning, the 8 positions and corresponding data bits are chosen from bits which are 4T apart in this case dm[28:4:0] where the ':4:' notation means bits being 4 apart. As with any of the floating tap architectures described herein, 8:4 mux group 1120 is quadrupled to ensure floating tap bits are eventually provided at 1T spaced resolution back to the input summing node. As shown, the quadrupled muxes employ data bits dm[28:4:0], dm[29:4:1], dm[30:4:2], dm[31:4:3].

FIG. 12 shows an exemplary block diagram of a downsampled prulgamation (short for pruning-amalgamation) floating-tap DFE. As shown in FIG. 12, data for 2 phases, CurrPhsA and CurrPhsB, is selected using first stage mux 1202. Subsequent mux selections perform 8 to 2 selections of 2 bits corresponding to floating-tap positions.

Other variations to the DFE architecture can be made and used with a shift register-based implementation of the downsampled floating-tap storage as described herein. For example, one or more taps in the fixed-tap section might be unrolled, the fixed-tap section might employ a 4T implementation instead of a 2T implementation, and other changes to the DFE.

Thus, as described herein, embodiments provide downsampling techniques within a to generate a more constrained set of floating-tap positions to yield a better performance versus power tradeoff for a given implementation. Downsampling techniques such as phase pruning and phase amalgamation might be employed to select floating-tap positions containing dominant ISI terms. Embodiments might cancel relatively large post-cursor ISI terms with the constrained floating taps while also requiring fewer circuit elements and employing lower clock rates, providing for a reduction in power consumption versus other DFE architectures. Described embodiments might employ digital shift registers (or arrays of digital flip-flops) to store delayed floating-tap data, which might reduce or eliminate calibrating analog delay elements to account for PVT variations. The shift registers might also be clocked at lower rates than the full symbol rate.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as aver electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required.

Conversely, the terms "directly coupled," "directly connected," etc., imply the absence of such additional elements.

It will be further understood that various changes in the details, materials, and arrangements of the parts which have been described and illustrated in order to explain the nature of this invention may be made by those skilled in the art without departing from the scope of the invention as expressed in the following claims.

We claim:

1. An apparatus for applying decision feedback equalization to an input signal, comprising:
   a set of fixed taps and a set of floating taps, wherein each tap corresponds to a detected symbol of the input signal with a period based on the symbol period, and wherein each of the floating tap detected symbols is stored in a corresponding shift register, wherein the shift register is configured to account for process, operating voltage and temperature (PVT) variations of the apparatus, thereby without calibration of one or more delay elements of the apparatus to account for PVT, wherein the floating taps are divided into even-phase floating taps and odd-phase floating taps, each corresponding to either even phases or odd phases of the sampling period of the input signal, the symbol values of the even-phase floating taps are stored in a first shift register and the symbol values of the odd-phase floating taps are stored in a second shift register;
   multiplexing logic configured to (i) select corresponding floating taps for equalization wherein outputs of the selected floating taps are coupled to the outputs of the fixed taps, (ii) select different phases of the input signal for each floating tap, and (iii) at least one of: prune and amalgamate the phases of each possible floating tap position to select the corresponding ones of the floating taps based on a magnitude of each phase, wherein the multiplexing logic couples selected outputs of each even-phase floating tap to the corresponding even-phase fixed taps and couples selected outputs of each odd-phase floating tap to the corresponding odd-phase fixed taps; and
   a combiner configured to (i) adjust each output value of one or more of the fixed taps and the output values of one or more of the selected floating taps by a corresponding tap-weight coefficient and (ii) combine the tap-weight coefficient adjusted values into an output signal,
   wherein the output signal of the combiner is subtracted from the input signal.

2. The apparatus of claim 1, wherein each floating tap is substantially based on a downsampled symbol period of the input signal, wherein the downsampled symbol period is based on at least one of the symbol period and an integer multiple of the symbol period.

3. The apparatus of claim 1, wherein the multiplexing logic is further configured to provide at least one of phase amalgamation and phase pruning.

4. The apparatus of claim 1, wherein the first and second shift registers are each clocked at a rate of pT, wherein T is the input signal symbol rate and wherein p is a positive integer.

5. The apparatus of claim 4, wherein the apparatus comprises n floating taps, n a positive integer, selected from m possible floating tap positions, m a positive integer greater than or equal to n, wherein the at least one shift register stores at least m data symbols.

6. The apparatus of claim 5, wherein for each of the n floating taps, the multiplexing logic is configured to select a corresponding phase of the input signal for the floating tap based on a magnitude of each phase, wherein the phase having the highest magnitude is selected.

7. The apparatus of claim 5, wherein n is equal to 4 and m is equal to 32.

8. The apparatus of claim 1, wherein the apparatus is embodied in a Serializer-Deserializer (SERDES) device.

9. The apparatus of claim 1, comprising 6 fixed taps.

10. The apparatus of claim 1, wherein the fixed taps are unrolled.

11. A method of applying decision feedback equalization to a signal, the method comprising:
    receiving a signal by a set of fixed taps and a set of floating taps of a receiver, wherein each tap corresponds to a detected symbol of the input signal with a period based on the symbol period, the receiving including dividing the floating taps into even-phase floating taps and odd-phase floating taps, each corresponding to either even phases or odd phases of the sampling period of the input signal;
    storing each of the floating tap detected symbols in a corresponding shift register, accounting for process, operating voltage and temperature (PVT) variations of the receiver, thereby without calibration of one or more delay elements of the receiver to account for PVT, the storing including storing the symbol values of the even-phase floating taps in a first shift register and storing the symbol values of the odd-phase floating taps in a second shift register;
    selecting, by multiplexing logic: (i) corresponding floating taps for equalization wherein outputs of the selected floating taps are coupled to the outputs of the fixed taps, and (ii) different phases of each possible floating tap position;
    coupling, by the multiplexing logic, selected outputs of each even-phase floating tap to the corresponding even-phase fixed taps and coupling selected outputs of each odd-phase floating tap to the corresponding odd-phase fixed taps;
    at least one of: pruning and amalgamating, by the multiplexing logic, the phases of each possible floating tap position, and selecting the corresponding ones of the floating taps based on a magnitude of each phase; and
    adjusting, by a combiner, each output value of one or more of the fixed taps and the output values of one or more of the selected floating taps by a corresponding tap-weight coefficient;
    combining, by the combiner, the tap-weight coefficient adjusted values into an output signal; and
    subtracting the output signal of the combiner from the input signal.

12. The method of claim 11, further comprising:
    downsampling a symbol period of the input signal, wherein the downsampled symbol period is based on at least one of the symbol period and an integer multiple of the symbol period.

13. The method of claim 11, further comprising at least one of:
    pruning, by the multiplexing logic, one or more phases from the floating taps; and
    amalgamating, based on a magnitude of each phase, one or more floating tap values.

14. The method of claim 11, further comprising:
    clocking the first and second shift registers at a rate of pT, wherein T is the input signal symbol rate and wherein p is a positive integer.

15. The method of claim 14, wherein, for the method, the set of floating taps comprises n floating taps, n a positive integer, selected from m possible floating tap positions, m a positive integer greater than or equal to n, wherein the at least one shift register stores at least m data symbols.

16. The method of claim 15, further comprising:
selecting, for each of the n floating taps by the multiplexing logic, a corresponding phase of the input signal for the floating tap based on a magnitude of each phase, wherein the phase having the highest magnitude is selected.

17. The method of claim 15, wherein, for the method, n is equal to 4 and m is equal to 32.

18. The method of claim 11, comprising 6 fixed taps.

19. The method of claim 11, wherein the fixed taps are unrolled.

20. A non-transitory machine-readable storage medium, having encoded thereon program code, wherein, when the program code is executed by a machine, the machine implements a method for applying decision feedback equalization to a signal, comprising the steps of:
receiving a signal by a set of fixed taps and a set of floating taps of a receiver, wherein each tap corresponds to a detected symbol of the input signal with a period based on the symbol period, the receiving including dividing the floating taps into even-phase floating taps and odd-phase floating taps, each corresponding to either even phases or odd phases of the sampling period of the input signal;
storing each of the floating tap detected symbols in a corresponding shift register, accounting for process, operating voltage and temperature (PVT) variations of the receiver, thereby without calibration of one or more delay elements of the receiver to account for PVT, the storing including storing the symbol values of the even-phase floating taps in a first shift register and storing the symbol values of the odd-phase floating taps in a second shift register;
selecting, by multiplexing logic: (i) corresponding floating taps for equalization wherein outputs of the selected floating taps are coupled to the outputs of the fixed taps, and (ii) different phases of each possible floating tap position;
coupling, by the multiplexing logic, selected outputs of each even-phase floating tap to the corresponding even-phase fixed taps and coupling selected outputs of each odd-phase floating tap to the corresponding odd-phase fixed taps;
at least one of: pruning and amalgamating, by the multiplexing logic, the phases of each possible floating tap position, and selecting the corresponding ones of the floating taps based on a magnitude of each phase; and
adjusting, by a combiner, each output value of one or more of the fixed taps and the output values of one or more of the selected floating taps by a corresponding tap-weight coefficient;
combining, by the combiner, the tap-weight coefficient adjusted values into an output signal; and
subtracting the output signal of the combiner from the input signal.

* * * * *